(12) United States Patent  
Goeller (10) Patent No.: US 6,926,240 B2  
(45) Date of Patent: Aug. 9, 2005

(54) STRAP-ON MULTI-FUNCTIONAL APPARATUS WITH INTEGRAL SUPPORTS AND WORK SURFACE FOR USE DURING FISHING, BOATING, CAMPING, ETC

(76) Inventor: Steve Goeller, 3814 Clarkes Point Rd., Baltimore, MD (US) 21220

( * ) Notice: Subject to any disclaimer, the term of this patent is extended or adjusted under 35 U.S.C. 154(b) by 0 days.

(21) Appl. No.: 10/713,844

(22) Filed: Nov. 14, 2003

(65) Prior Publication Data

US 2004/0094071 A1 May 20, 2004

Related U.S. Application Data

(60) Provisional application No. 60/426,274, filed on Nov. 14, 2002.

(51) Int. Cl.$^7$ ............................. A47G 29/00; A47B 5/00
(52) U.S. Cl. ..................... 248/218.4; 108/151; 108/152
(58) Field of Search ........................... 248/218.4, 219.4, 248/219.1, 219.3, 219.2, 227.3, 238; 211/107; 108/151, 152, 42; 182/187; 43/54.1; 452/194

(56) References Cited

U.S. PATENT DOCUMENTS

| | | | | |
|---|---|---|---|---|
| 3,638,843 A | * | 2/1972 | Ortynski | 224/199 |
| 4,271,624 A | * | 6/1981 | Peluso | 43/54.1 |
| 4,587,757 A | * | 5/1986 | Lirette | 43/21.2 |
| 4,794,670 A | * | 1/1989 | Savastano, Jr. | 452/149 |
| 5,156,096 A | * | 10/1992 | Lamprey | 108/152 |
| 5,159,777 A | * | 11/1992 | Gonzalez | 43/54.1 |
| 5,474,494 A | * | 12/1995 | Sims | 452/194 |
| 5,609,521 A | * | 3/1997 | Allred et al. | 452/194 |
| 6,014,833 A | * | 1/2000 | Benavidez | 43/54.1 |
| 6,019,264 A | * | 2/2000 | Strieber | 224/270 |
| 6,170,189 B1 | * | 1/2001 | Klein | 43/17 |
| 6,581,891 B1 | * | 6/2003 | Byrd | 248/219.4 |

* cited by examiner

Primary Examiner—Anita M. King
(74) Attorney, Agent, or Firm—Law Offices of Royal W. Craig (57) ABSTRACT

Disclosed herein is a multi-functional apparatus for use during fishing, boating, camping, etc. that typically comprises a flat horizontal surface, two hinged support panels attached to the underside of the horizontal surface, three adjustable-length attachment straps, and one or more rod support tubes. The multi-functional apparatus of the present invention provides a mechanism for detachable attachment to any vertical member such as a pier piling, a bridge structure, or a tree trunk. The present invention is fabricated of strong, lightweight, plastic materials to provide the durability required by the nature of its usage. The present invention's design is simple, scalable, and can be economically manufactured and sold. In use, the present invention is attached to a vertical member conveniently located at the fishing site. Once baited and cast, one or more fishing rods may be supported in an upright orientation, awaiting a strike by a fish, by placing the handle(s) into the support tube(s). While the fishing process continues uninterrupted, any fish that have been caught may be cleaned/filleted on the integral, horizontal work surface. The present invention may also be used to hold one or more fishing rods in an upright position so that they may be cleaned. During the cleaning process, the horizontal surface may be used to hold items such as cleaning rags or soap in a convenient location.

19 Claims, 7 Drawing Sheets

STRAP-ON MULTI-FUNCTIONAL APPARATUS WITH INTEGRAL SUPPORTS AND WORK SURFACE FOR USE DURING FISHING, BOATING, CAMPING, ETC

CROSS-REFERENCE TO RELATED APPLICATION(S)

This application derives priority from U.S. Provisional Patent Application Ser. No. 60/426,274, filed 14 Nov. 2002.

BACKGROUND OF THE INVENTION

1. Field of the Invention

The present invention relates to accessories used during fishing, boating, camping, etc. and, more particularly, to a fishing rod holder with an integral fish cleaning/filleting work surface that may be attached to all types of vertical members (e.g. pier pilings, bridge structures, trees).

2. Description of the Background

While fishing with a fishing pole, it is frequently necessary for a fisherman to use both hands for threading a line and/or attaching lures, hooks, leaders, etc. to the line. Other tasks requiring the use of both hands include baiting the hook, cleaning fouled hooks, and removing fish that have been caught. Freeing both hands from the fishing pole normally means that the fisherman must let go of the fishing pole, running the risk of dropping it into the water or fouling the reel or line. While in may be possible, when fishing from the shore, to lean the pole against a chair or pier/bridge railing, the pole often falls down. In addition to the inconvenience of having to retrieve it, the fishing pole can be damaged when it falls. Furthermore, the fishing pole's line can become tangled when it falls over, especially when several adjacent fishing poles fall together into a pile.

On frequent occasions fishermen prefer to relax and fish "hands free," or to fish utilizing multiple fishing poles simultaneously. In these situations conventional rod holders allow the fisherman to take his hands off the fishing pole while having it rest in an upwardly inclined orientation. This way they can attend to other tasks such as eating a snack or opening a canned beverage. However, existing rod holders are designed for permanent mounting on a boat or dock. In most cases, a fisherman does not own the location from which he fishes and it is not proper to permanently attach rod holder(s). Of course, many do it anyway and they are the ire of marina owners whose docks and pylons are fraught with nails.

In addition to the above-described need for temporary rod holders, the typical fisherman has many other support-related needs when dock-fishing and yet, invariably, has no means of achieving the required support. For example, cleaning and filleting the day's catch requires a filleting table or appropriate work surface, one that is sufficient in surface area to accommodate fish of varying sizes, sturdy enough to withstand the downward force required to cut off the head or tail of a fish, and resistant to the effects of the bladed instrument used for cutting purposes. Few docks or dock owners gratuitously provide filleting tables for fisherman, nor do they appreciate filleting without one.

There is a significant consumer demand for fishing accessories that can be transported by fisherman to the dock in satisfaction of the above-described needs, and be utilized without defacing the dock in any way. Of course, any fishing pole support apparatus and/or cleaning/filleting work surface must be sufficiently light in weight and appropriate in size to be easily and readily transported along with the rest of the fisherman's gear. Indeed, it would be best to provide a single multi-functional device to fill all such needs. This would increase both functionality and portability at the fishing site, which may be some distance from where the fisherman parks his/her vehicle.

The present inventor is not the first to address the need for a means of supporting a fishing pole in a "hands free" manner, or to provide a readily transportable table for fish filleting/cleaning, or to combine a "hands free" fishing pole support apparatus with a surface suitable for the cleaning/filleting process. Examples of apparatus for these purposes may be found in U.S. Pat. Nos. 3,344,551 and 4,497,129 to Chestnut, U.S. Pat. No. 5,542,359 to Polries, U.S. Pat. No. 5,860,367 to Riegel et al., U.S. Pat. No. 5,915,942 to Ratliffe, and U.S. Pat. No. 6,269,990 to Gray, as well as U.S. Des. Pat. No. 231,525 to Curtis.

U.S. Pat. No. 5,915,942 to Ratliffe discloses a fishing rod holder that may be used to secure a fishing rod to a boat, pier, or other support structure. The device includes an elongated tubular housing and a bracket upon which the housing may be removably seated. The bracket may be attached to horizontal support structures via a shepherd's hook, or to vertical support structures via straps.

U.S. Pat. No. 6,269,990 to Gray discloses an apparatus for holding a fishing rod that includes a tube for receiving the end of the fishing rod to a depth effective to retain the fishing rod therein, and a leg brace for releasable attachment to a leg of the user. The leg brace includes a shaped rigid member that partially surrounds the leg, and a plurality of attachment straps.

U.S. Des. Pat. No. 231,525 to Curtis discloses a fishing pole holder with adjustable attachment straps and a compartment to which a fish stringer holder may be attached.

U.S. Pat. Nos. 3,344,551 and 4,497,129 to Chestnut disclose fishing rod holders having ground inserted posts for vertical support. The fishing rod holders each include a bait box and a cutting board where the cutting board forms the bottom of the bait box. The '129 device also includes triangular supports to brace the bait box and cutting board, and a slot for a bait knife.

U.S. Pat. No. 5,542,359 to Polries discloses a portable and collapsible fish cleaning table with a horizontal, upwardly facing work surface for supporting a fish during the cleaning operation. Collapsible legs are connected to the tabletop. The legs can be folded to a collapsed position for compact storage when the table is to be transported from one location to another. A retaining means is also operatively associated with the table legs for releasably holding the legs in the erect position to support the tabletop member during use.

U.S. Pat. No. 5,860,367 to Riegel et al. discloses a portable table for cleaning fish, fowl, and other game. A one-piece molded work tray is mounted on foldable legs. The foldable legs of preferably scissors type folding legs with a center brace and chain support. The work tray rests on the top of the unfolded legs. The rim of the work tray contains diagonal cutouts for the legs to pass through so that the folded legs may be stored inside the work tray.

Unfortunately, each of the aforementioned prior art references possess fall short of the optimum fishing accessory. The strap-on fishing rod holders of the Ratliffe, Gray, and Curtis patents do not support more than one rod holder, nor do they include an integral cleaning/filleting work surface. While the fishing rod holders of the Chestnut patents do include an integral cutting board, their "in-ground only" anchoring means places significant limitations on their utility. For example, they cannot be utilized on a pier or bridge surface because their ground-inserted posts cannot penetrate solid, man-made surfaces (e.g. structural concrete or steel). Finally, while possessing a collapsible construction claiming to be a sufficiently sturdy table for the fish cleaning/filleting process, the portable filleting tables of the Polries and Riegel et al. patents have no means for supporting a fishing pole, thereby preventing simultaneous cleaning/filleting and fishing.

There remains a need for a fishing rod support apparatus, with an integral horizontal working surface, that may be detachably attached to any vertical member such as a pier piling or a bridge structure. A device of this sort would allow a fisherman to make better use of his/her time by providing for simultaneous fishing and fish cleaning/filleting. The cleaning/filleting process would not have to wait until the fisherman obtained access to an appropriate work surface (e.g. a countertop located at his/her residence). To the best of the knowledge of the present inventor, no such apparatus exists. An apparatus of this type should, in addition to the capabilities outlined above, possess a simple design, be fabricated of strong, lightweight materials, and be economical to manufacture.

SUMMARY OF THE INVENTION

It is, therefore, the primary object of the present invention to provide an improved strap-on multi-functional apparatus incorporating an integral fish cleaning/filleting work surface, rod holder(s), and means for attaching a variety of other components.

It is another object of the present invention to provide an improved fishing rod support apparatus that is collapsible such that it may be easily and readily transported.

A further object of the present invention is to provide an improved fishing rod support apparatus having means for detachable attachment to any vertical member, especially dock pilings, without defacing same.

Still another object of the present invention is to provide an improved fishing rod support apparatus that is not subject to material fatigue/failure or deformation.

It is another object of the present invention to provide an improved fishing rod support apparatus that may be used to hold one or more fishing rods simultaneously.

An additional object of the present invention is to provide an improved rod support apparatus that is simple in design, light in weight, easy to use, and inexpensive to manufacture and sell.

These and other objects are accomplished by a fishing rod support apparatus typically comprising a horizontal surface bounded on three sides by two side walls and a back wall, two hinged support panels attached to the underside of the horizontal surface, three adjustable-length attachment straps, and one or more rod support tubes. The fishing rod support apparatus of the present invention provides means for detachable attachment to any vertical member such as a pier piling, a bridge structure, or a tree trunk. The present invention is fabricated of strong, lightweight, plastic materials, such as PVC, to provide the durability required by the nature of its usage. The present invention's design is simple and scalable (i.e. it may vary in size to fit various applications), and can be economically manufactured and sold.

In use, the present invention is attached to a vertical member conveniently located at the fishing site. Once baited and cast, one or more fishing rods may be supported in an upright orientation, awaiting a strike by a fish, by placing the handle(s) into the support tube(s). While the fishing process continues uninterrupted, any fish that have been caught may be cleaned/filleted on the integral, horizontal work surface.

The present invention may also be used to hold one or more fishing rods in an upright position so that they may be cleaned. Holding the rods in the controlled manner provided by the present invention is far superior to laying them on the ground, pier, or boat deck where they may be stepped on, tripped over, or knocked overboard. During the cleaning process, the horizontal surface may be used to hold items such as cleaning rags or soap in a convenient location.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

FIGS. 1–4 are, respectively, side, two front, and rear perspective views of an improved multi-functional fishing rod support apparatus 10 according to a first embodiment of the present invention. The apparatus 10 generally comprises a plurality of attachment straps 60 for attachment of one or more rod support tubes 80 to a piling, plus a removable utility/fillet table comprising two support panels 40 attached to the underside of a work surface 20.

The apparatus 10 is fully adjustable and can be attached to any vertical member 15 such as a pier piling, a bridge railing structure, or a tree trunk, etc., without defacing the member in any way.

The removable utility/fillet table has an integral work surface 20 that generally comprises a flat horizontal plate member 24 bounded on three sides by two side wall members 28 and a back wall member 32. The horizontal plate member 24, side wall members 28, and back wall member 32 are preferably fabricated of commercially-available, rigid, plastic resin, such as propylene polymer. However, other materials (e.g. PVC) may be utilized in the construction of the various members 24, 28, 32 so long as they are durable enough to withstand the forces and cutting actions of the fish cleaning/filleting process, and light enough to form an easily transported apparatus 10. The side wall members 28 and back wall member 32 are typically fixedly attached to the plate member 24 by a plurality of screws 34, although other attachment means such as glue may be used.

Given that the body of the fish being cleaned/filleted will be slippery, the wall members 28, 32 are included to form a perimeter that assists in keeping the fish on the plate member 24. The top edge of each side wall member 28 may be angled. If so, the side wall members 28 are typically oriented such that their highest points are those where they are attached to the back wall member 32. Additionally, the work surface 20 is preferably formed with a plurality of drainage openings 36 to provide for the clearing of blood and other fish-based fluids from the plate member 24. The drainage openings 36 are typically cut-outs in the lower section of the back wall member 32, along the edge that contacts the plate member 24.

Figure 6:
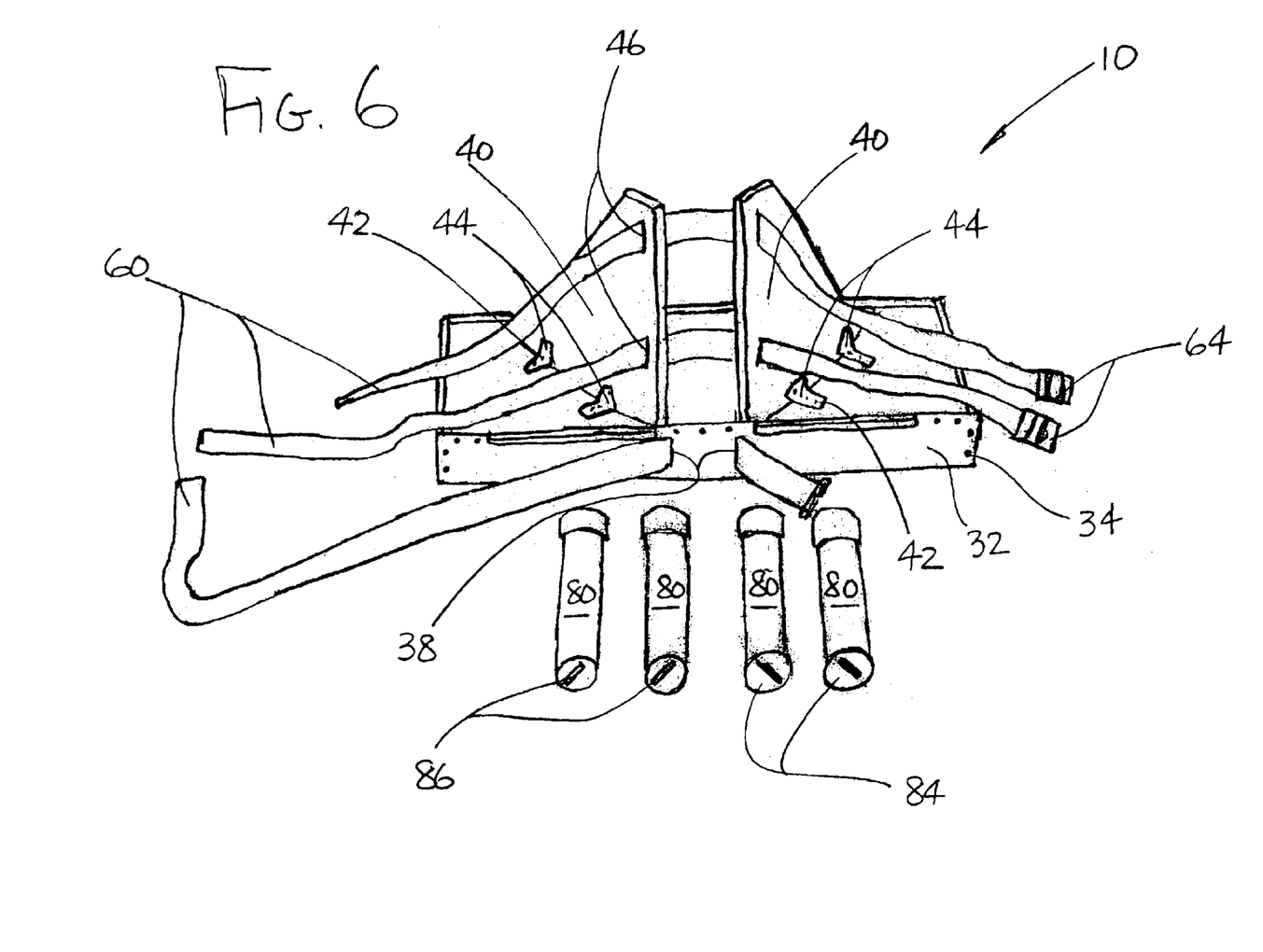
FIG. 6 is a rear perspective view of the fishing rod support apparatus 10 as in FIG. 5 shown with the hinged support panels 40 in the extended position.
Figure 7:
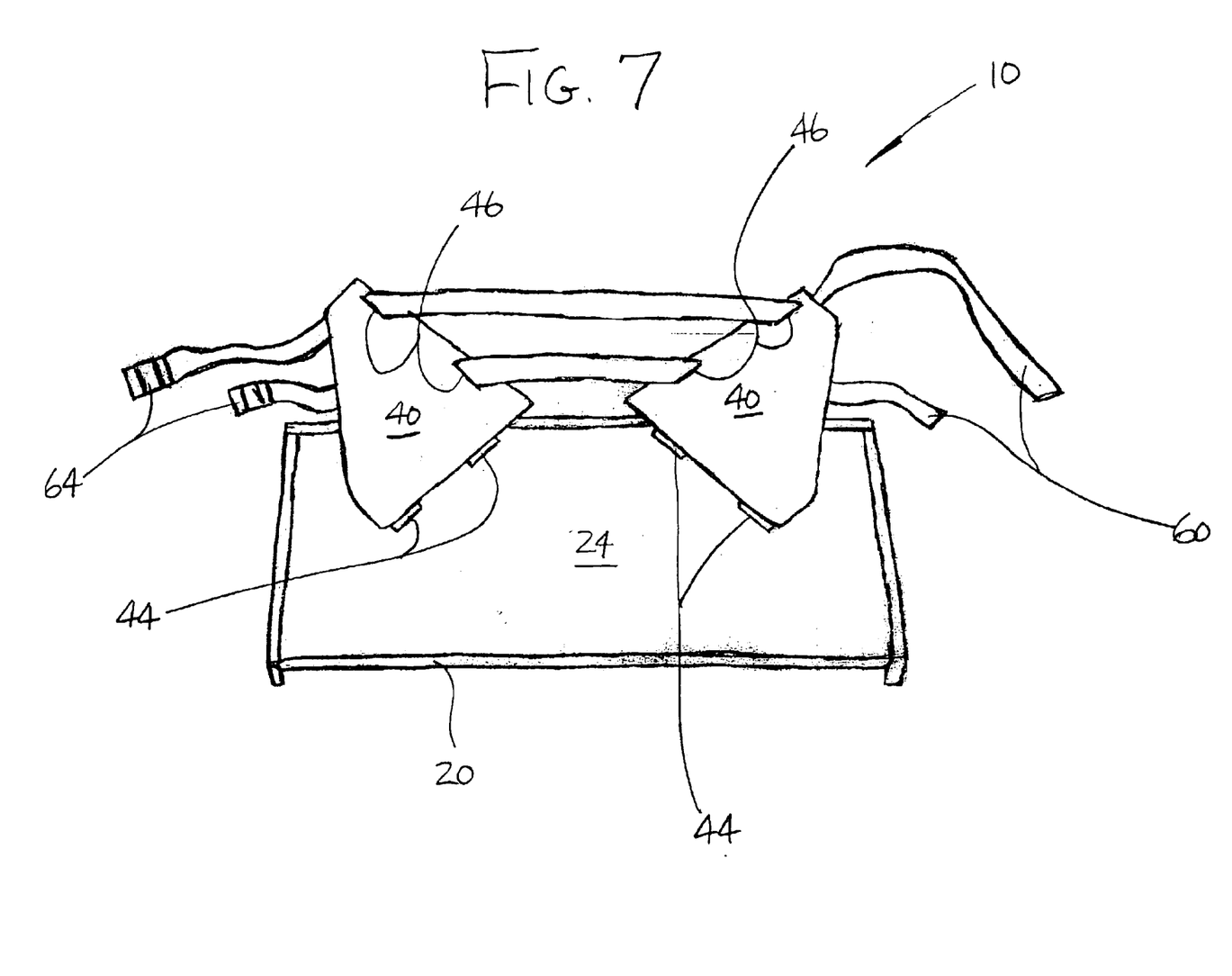
FIG. 7 is a rear perspective view of the fishing rod support apparatus 10 as in FIGS. 5 and 6 shown with the hinged support panels 40 in the folded or collapsed position.

Two support panels 40 are attached to the underside of the plate member 24 via a plurality of commercially-available hinges 44 (see FIGS. 6 and 7). The panels 40 are preferably fabricated of commercially-available, rigid, plastic materials such as PVC. However, any material durable enough to withstand the forces generated by the fish cleaning/filleting process, and light enough to allow easy transportation may be utilized in the construction of the panels 40. The hinges 44 are typically fixedly attached to the panels 40 and the plate member 24 by a plurality of screws 42, although other attachment means may be used.

A plurality of attachment straps 60 are included to provide the means for temporarily attaching the multi-functional fishing accessory 10 to a vertical member 15. The straps 60 are preferably fabricated from a strong, yet flexible material such as commercially-available nylon braid. One end of each strap 60 is typically formed with a buckle 64 (see FIG. 5) into which the opposite end is inserted, such that the strap 60 may be tightened, or adjusted in length, around a vertical member 15. Alternative embodiments may include straps 60 that are elastically extendable, or formed with a hook and loop fastening system (e.g. VELCRO®).

A sliding connection between a strap 60 and the back wall member 32 is created by inserting the strap 60 through a pair of slots 38 (see FIG. 6) formed vertically in the back wall member 32. Sliding connections between two or more straps 60 and the two support panels 40 are created by inserting the straps 60 through slots 46 (see again FIG. 6) formed vertically in the support panels 40.

Each support tube 80 is a cylindrical section typically closed at one end by an end cap 84 (see FIG. 6). Each support tube 80 is preferably fabricated of a commercially-available, lightweight plastic material such as plastic resin or PVC. The end cap 84 may be formed with an opening 86 to provide for drainage from the tube 80. Each support tube 80 preferably includes two loops 82 (see FIG. 5) fixedly attached to its side in a laterally aligned orientation. The loops 82 are typically attached to the tube 80 by a plurality of rivets 83, although other attachment means such as screws may be used. The loops 82 are preferably fabricated from a strong, yet flexible material such as commercially-available nylon fabric. A sliding connection between each support tube 80 and the attachment straps 60 is created by inserting the straps 60 through the loops 82.

Figure 1:
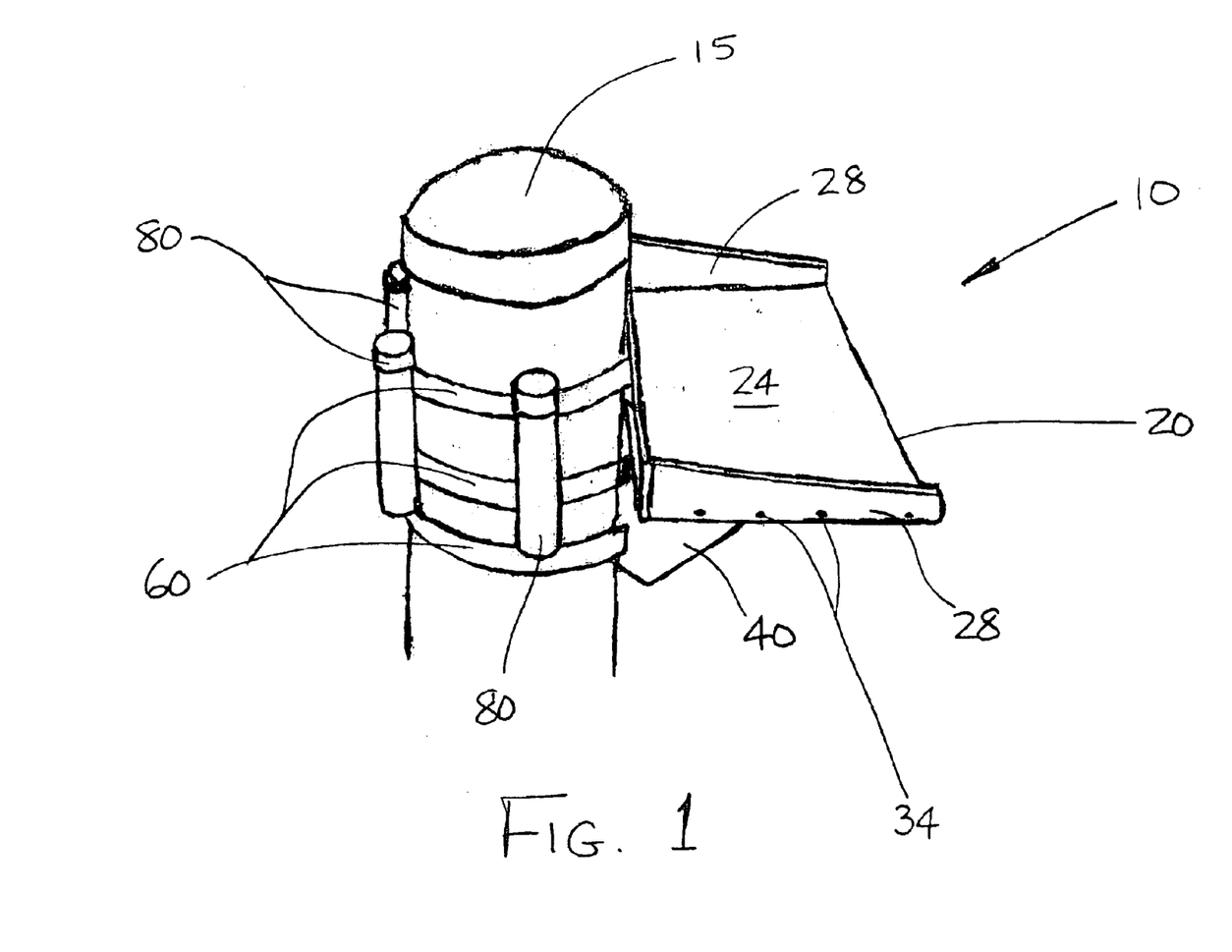
FIG. 1 is a side perspective view of an improved fishing rod support apparatus 10 according to a first embodiment of the present invention shown attached to a pier piling.
Figure 2:
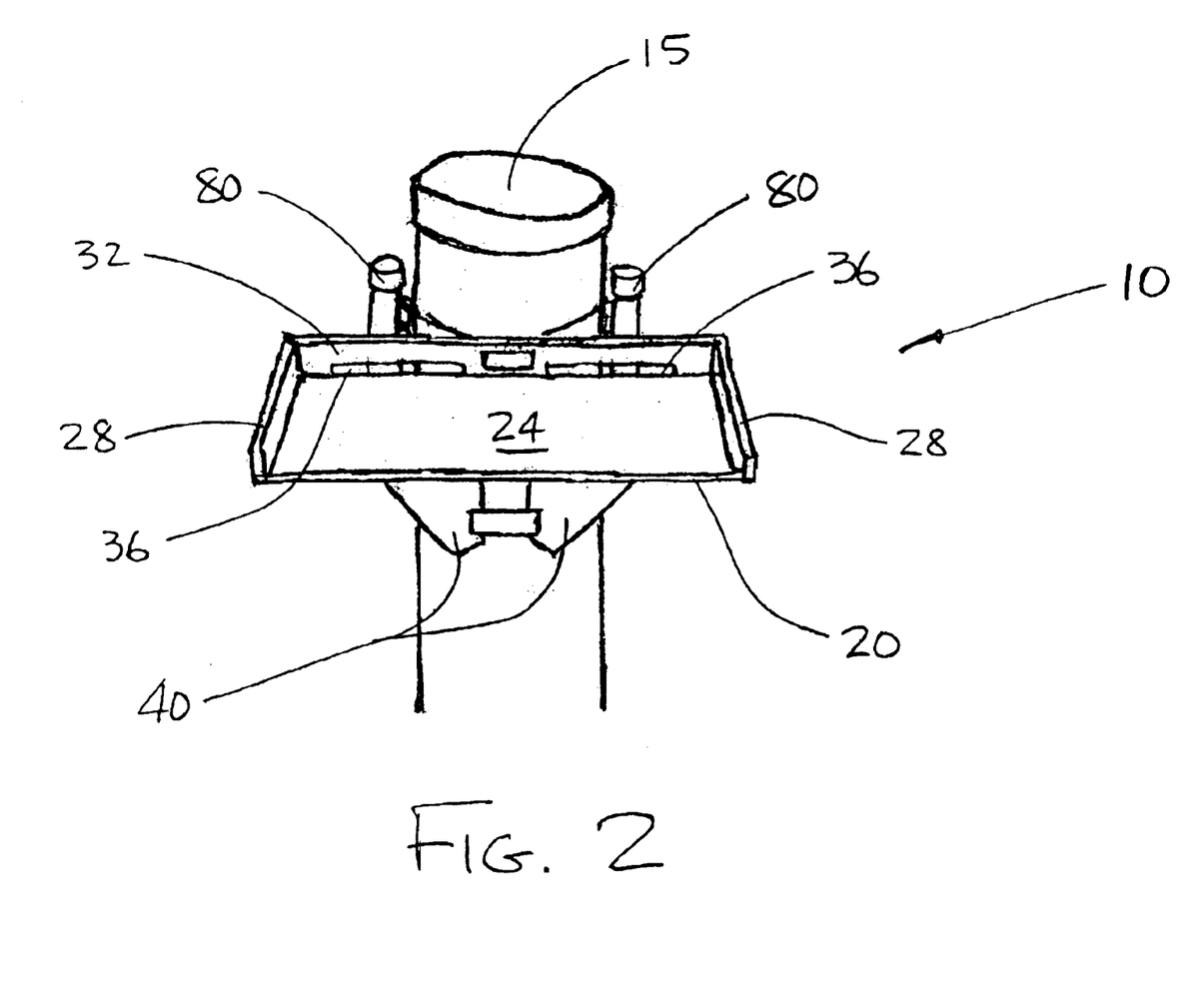
FIG. 2 is a front perspective view of the fishing rod support apparatus 10 as in FIG. 1.
Figure 3:
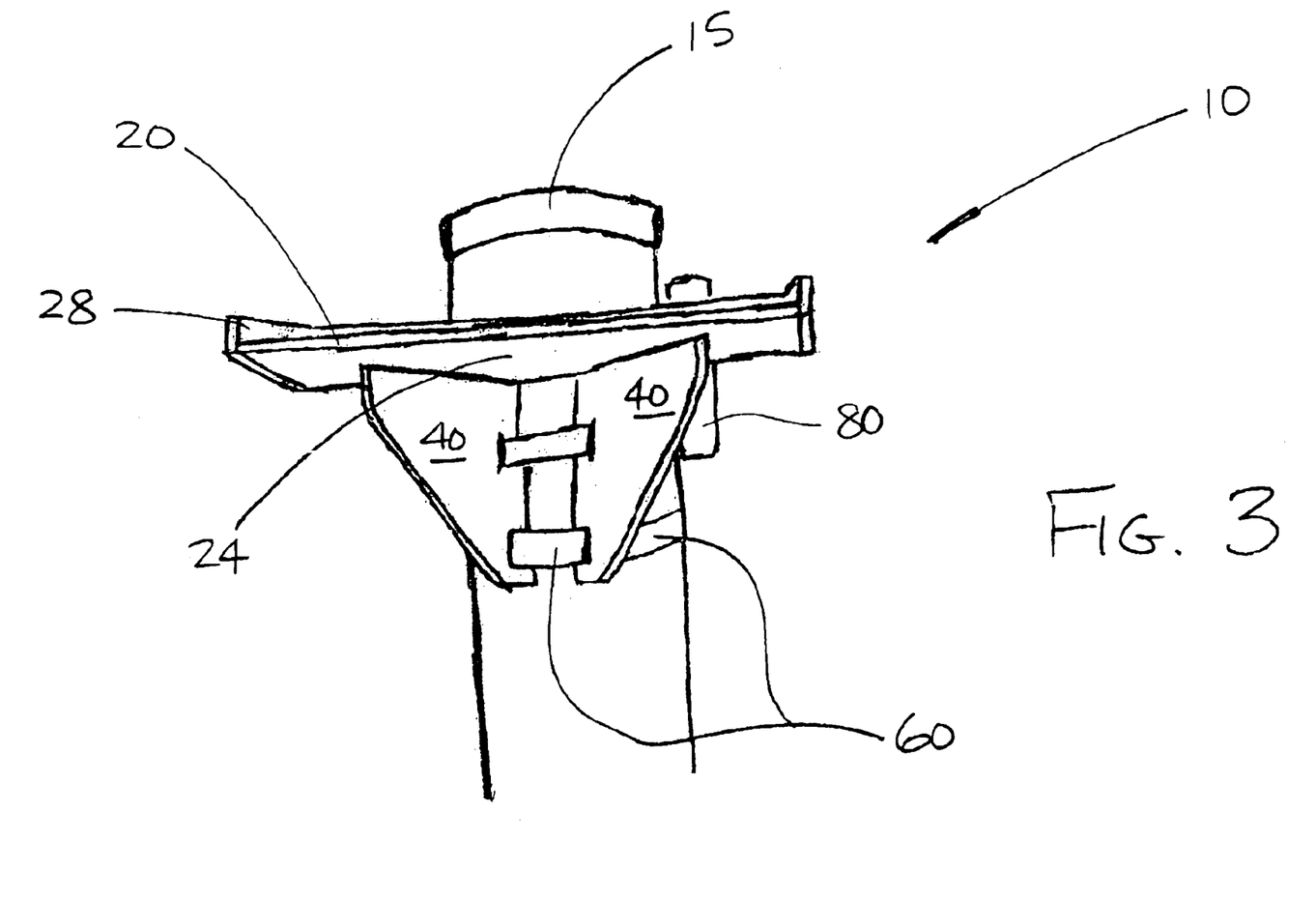
FIG. 3 is another front perspective view of the fishing rod support apparatus 10 as in FIGS. 1 and 2.
Figure 4:
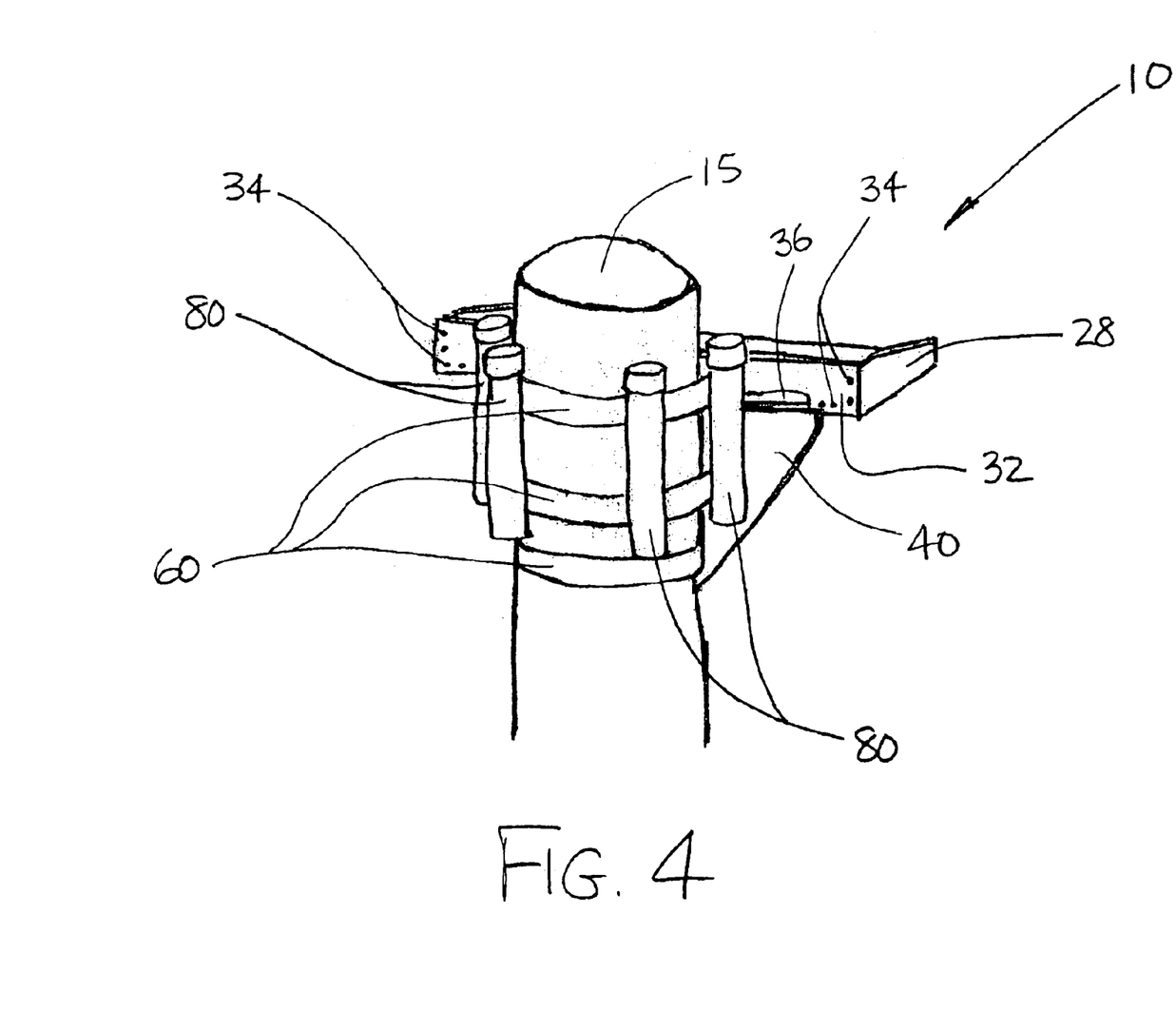
FIG. 4 is a rear perspective view of the fishing rod support apparatus 10 as in FIGS. 1–3.
Figure 5:
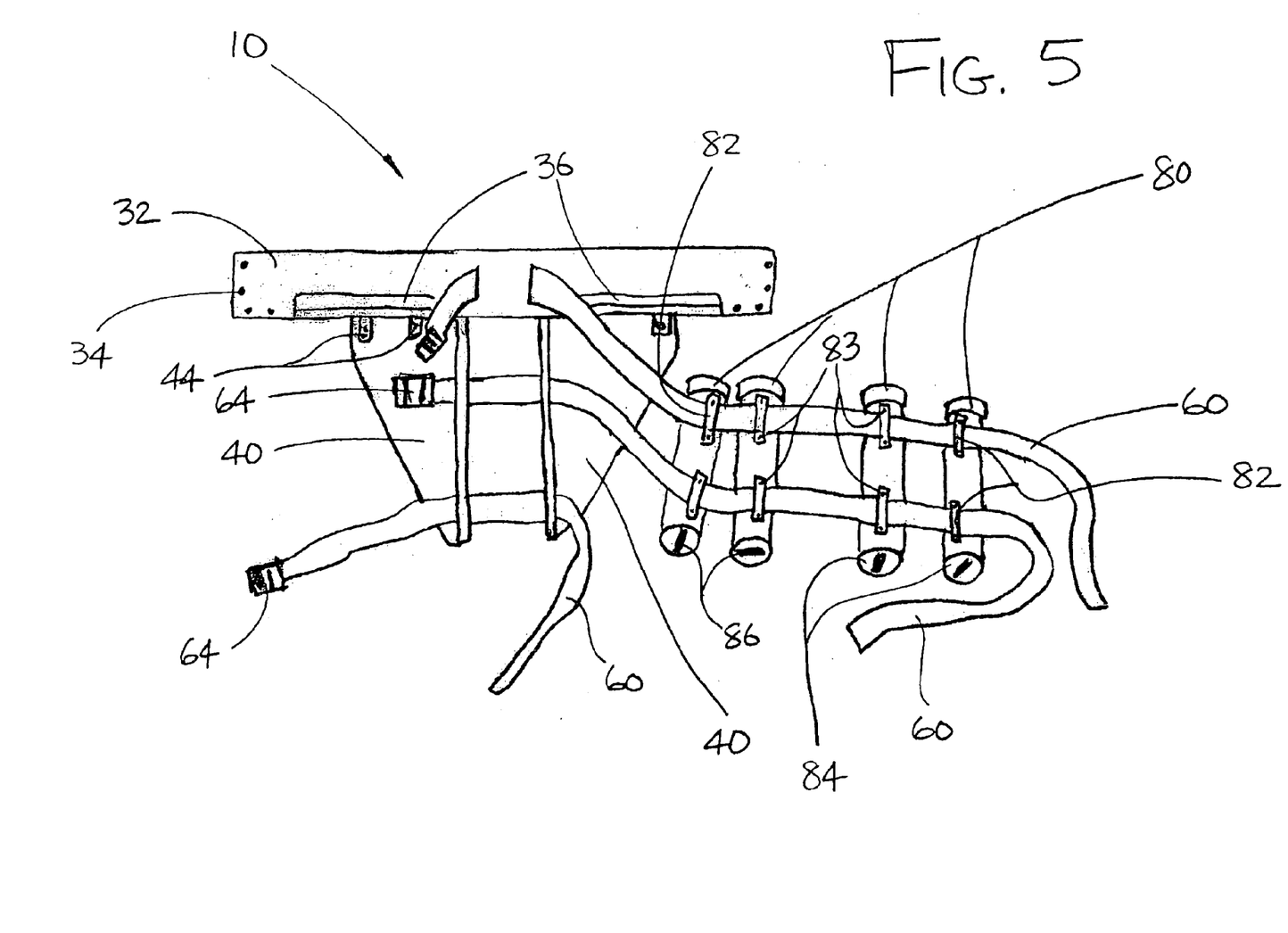
FIG. 5 is a rear perspective view of the fishing rod support apparatus 10 shown in an unattached condition.

FIGS. 5–7 are a series of rear perspective views of the multi-functional fishing accessory 10 shown unattached to a vertical member.

More specifically, FIG. 6 shows the hinged support panels 40 in the extended position (i.e. that used to support the apparatus 10 against a vertical member).

FIG. 7 shows the panels 40 in the folded or collapsed position. With the support panels 40 in the folded/collapsed position, the volume occupied by the present invention is minimized for storage or transportation purposes. As can be seen, the support tubes 80 may remain attached (FIG. 5) to the straps 60, or be completely detached (FIG. 6) from them for storage or transportation.

In use, with reference to all of FIGS. 1–7, the present invention is attached to a vertical member 15 conveniently located at the fishing site. The attachment straps 60 are adjusted in length to hold the back wall member 32, the edges of the support panels 40, and one or more support tubes 80 firmly against the side(s) of a vertical member 15. This forms a means for holding one or more fishing rods in a vertical orientation and a stable fish cleaning/filleting platform. The multi-functional fishing accessory 10 attaches to any vertical member 15 regardless of its cross-sectional configuration (e.g. a round pier piling, a square/rectangular bridge railing, an irregularly-shaped tree trunk). Once baited and cast, one or more fishing rods (not shown in the Figures) may be supported in an upright orientation, awaiting a strike by a fish, by placing the handle(s) into the support tube(s) 80. When two or more support tubes 80 are utilized, they are generally positioned in a user-defined, spaced apart configuration (see FIGS. 1 and 2) about the circumference of the vertical member 15. While the fishing process continues uninterrupted, any fish that have been caught may be cleaned/filleted on the integral, horizontal work surface 20.

The apparatus 10 may also be used to hold one or more fishing rods in an upright position so that they may be cleaned. Holding the rods in the controlled manner provided by the apparatus 10 is far superior to laying them on the ground, pier, or boat deck where they may be stepped on, tripped over, or knocked overboard. During the cleaning process, the work surface 20 may be used to hold items such as cleaning rags or soap in a convenient location.

As is readily perceived in the foregoing description, the present invention's design is simple and scalable (i.e. it may be varied in size to fit various applications), and may be economically manufactured and sold. The multi-functional fishing accessory 10 of the present invention provides a fisherman with the means to clean/fillet those fish that have been caught while continuing his/her efforts to catch more. The present invention is fabricated of strong, lightweight, plastic materials such as PVC to provide the durability required by the nature of its usage (e.g. resistance to deformation by the bladed instruments used to clean/fillet fish).

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A multi-functional fishing accessory comprising:
a work surface, said work surface comprising a flat plate member, and a pair of support panels attached to an underside of the work surface and extending downward therefrom in a spaced relation;
one or more fishing rod support tubes each for maintaining a fishing rod in a substantially upright position;
at least one strap slidably connected through said one or more fishing rod support tube(s) and through the pair of support panels for connecting around a vertical member and thereby detachably attaching said work surface and said one or more support tubes to said vertical member.

2. The multi-functional fishing accessory according to claim 1, wherein said work surface further comprises two side wall members fixedly attached to said plate member and a back wall member fixedly attached to said plate member and said side wall members.

3. The multi-functional fishing accessory according to claim 2, wherein an edge of each of said two side wall members is angled.

4. The multi-functional fishing accessory according to claim 2, wherein said work surface further comprises a plurality of drainage openings.

5. The multi-functional fishing accessory according to claim 4, wherein said plurality of drainage openings is formed by a plurality of cut-out sections in said back wall member along an edge fixedly attached to said plate member.

6. The multi-functional fishing accessory according to claim 2, wherein said plate member, said two side wall members, and said back wall member are fabricated of a rigid, plastic resin.

7. The multi-functional fishing accessory according to claim 6, wherein said rigid, plastic resin is a propylene polymer.

8. The multi-functional fishing accessory according to claim 1, wherein each of said one or more fishing rod support tubes comprises a cylindrical section closed at one end by an end cap and two loops fixedly attached to the external surface of said cylindrical section in a laterally aligned orientation.

9. The multi-functional fishing accessory according to claim 8, wherein said end cap is formed with an opening for drainage purposes.

10. The multi-functional fishing accessory according to claim 8, wherein said cylindrical section and said end cap are fabricated of a plastic resin.

11. The multi-functional fishing accessory according to claim 8, wherein said plurality of straps are each slidably attached to said one or more support tubes through a corresponding one of said two loops.

12. The multi-functional fishing accessory according to claim 8, wherein each of said two loops is fabricated of nylon.

13. The multi-functional fishing accessory according to claim 12, wherein each of said pair of support panels is hingedly attached to said work surface.

14. The multi-functional fishing accessory according to claim 13, wherein said pair of support panels is fabricated of a rigid plastic.

15. The multi-functional fishing accessory according to claim 14, wherein said rigid plastic is PVC.

16. The multi-functional fishing accessory according to claim 1, wherein said at least one strap further comprises plurality of straps.

17. The multi-functional fishing accessory according to claim 16, wherein each of said plurality of straps comprises;
a buckle defining a first end; and
a second end configured for insertion into said buckle;
whereby said strap is adjusted in length to detachably attach said multi-functional fishing accessory to said vertical member.

18. The multi-functional fishing accessory according to claim 16, wherein each of said plurality of straps is fabricated of nylon.

19. The multi-functional fishing accessory according to claim 16, wherein said plurality of straps is slidably attached to said work surface and each of said one or more support panels.

* * * * *